Jan. 26, 1954
J. F. ALCOCK
2,667,034
AIR TURBINE POWER PLANT HAVING ROTARY
REGENERATOR TO TRANSFER HEAT FROM AN
AFTERBURNER TO THE MOTIVE FLUID
Filed March 24, 1947
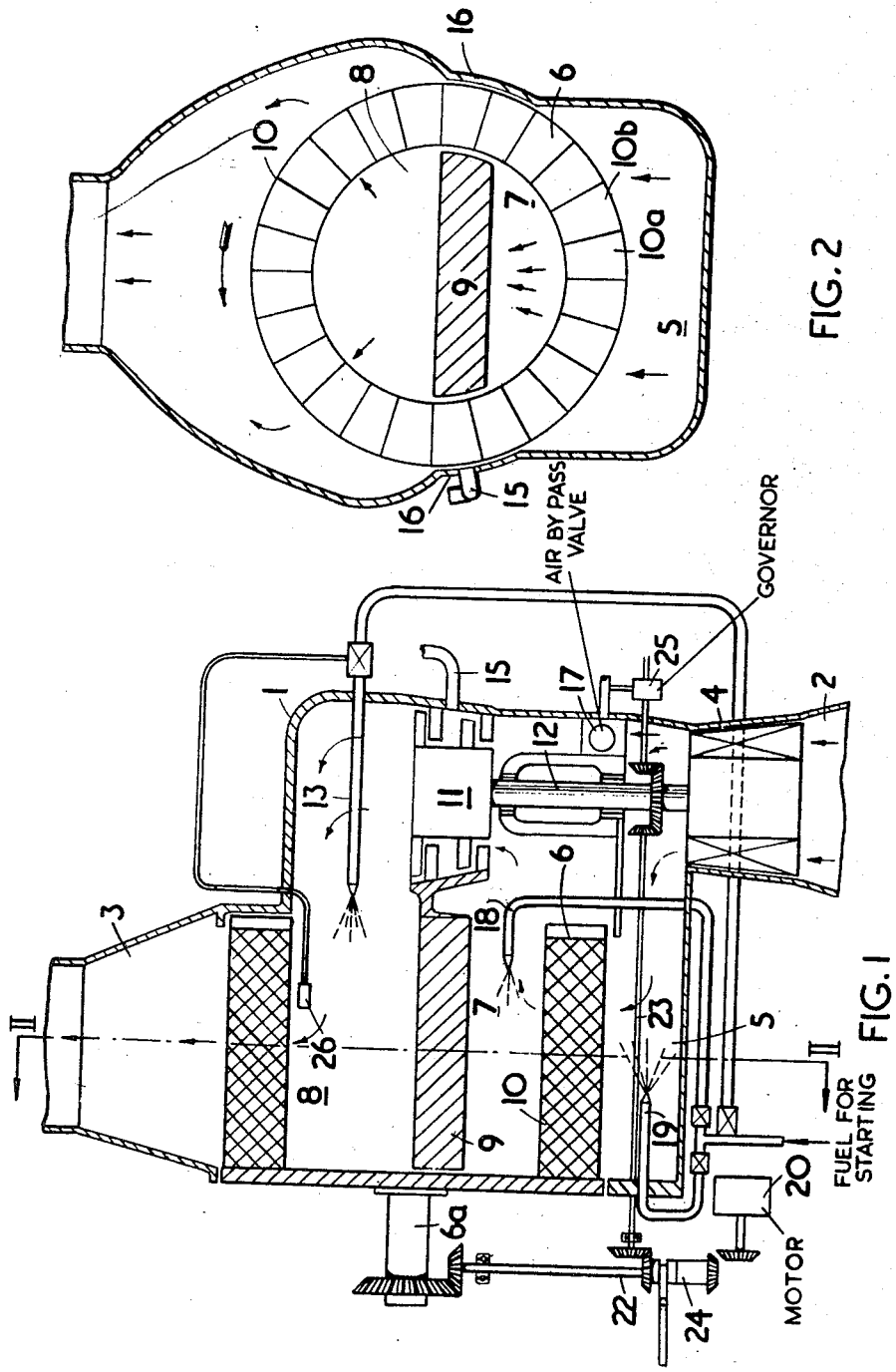

Patented Jan. 26, 1954

2,667,034

UNITED STATES PATENT OFFICE 2,667,034

AIR TURBINE POWER PLANT HAVING ROTARY REGENERATOR TO TRANSFER HEAT FROM AN AFTERBURNER TO THE MOTIVE FLUID

John Forster Alcock, North Lancing, England, assignor to Power Jets (Research and Development) Limited, London, England, a British company Application March 24, 1947, Serial No. 736,683

Claims priority, application Great Britain April 1, 1946

3 Claims. (Cl. 60—59)

This invention relates to turbine power plants such as may be used for prime mover purposes in ships, vehicles, power stations or the like or used as a generator of energy in the form of a supply of gas energised by heat, velocity and pressure and more particularly to plant operating on a constant pressure open cycle basis.

In gas-turbine practice generally, high blade speeds are employed and blade stresses and temperatures are limiting factors both on performance and longevity. Anything which tends to erode or notch the turbine blades is seriously disadvantageous and from the metallurgical aspect it may be desirable to rid the blading from any contact with gaseous combustion products, e. g. oxides of sulphur.

The object of the invention is to provide improved air turbine plant of the type in which combustion products do not pass though the turbine, wherein heat of combustion in the exhaust stream of the turbine is utilized in a moveable matrix regenerative heat exchanger to heat the compressed air supply to the input of said turbine.

The movable matrix regenerative heat exchanger comprises a rotary holder of matrix material of which segmental divisions are consecutively interposed in the path of the combustion products (the heater fluid) and the path of the compressed air (the heated fluid) and which for preference consists of a rotary drum the wall of which is, in effect, the matrix and within which is a chordwise separating wall forming two chambers, one for the heater and the other for the heated fluid. The regenerator may also have provision for passing through the matrix a flow of scavenging air both to mitigate certain losses and to remove solid ash, carbon or other waste which might, if left, impair the efficiency of the regenerator.

In order that the invention may be clearly understood it will now be described by way of example in one convenient embodiment which is illustrated in the accompanying diagrammatic drawing in which:

Figure 1 is a side elevation in section of a gas turbine power plant according to the invention, and Figure 2 is a section on the line II—II of Figure 1.

The plant comprises a casing 1 which is lagged against heat loss, and which has an air intake entry 2 and an exhaust stack 3. The air entry leads air into a multistage axial air compressor 4 which after any required diffuser, delivers into an air chest 5, of which one wall is formed by the external surface of a regenerator drum 6 of annular section. The interior of this drum is divided into two chambers 7, 8 by a substantially chordwise wall 9 the edges of which are sufficiently close to the internal surface of the drum to minimise leakage. The compressed air, having passed through the matrix 10, conveniently divided into segments 10A, 10B, etc., forming (with supporting structure) the drum, is ducted to the intake side of an air turbine 11, which is directy coupled to the compressor rotor by shaft 12. From the turbine the air exhausts into the chamber 8 of the drum but on its way it has fuel burnt in it. This is provided for by oil-fuel combustion apparatus 13. The fact that the air is already heated will facilitate combustion at least for some kinds of fuel. After this combustion the gaseous products pass through the matrix 10 and are led out through the stack 3, giving up heat to the matrix. The drum through its shaft 6A may be rotated by any suitable motor means, for example by a motor 20 through clutch 24 and shaft 22. The drum may be driven by the turbine 11 itself through shaft 23, clutch 24 and shaft 22.

The cycle will be evident; it differs from the more orthodox constant-pressure gas turbine cycle in that the fuel is burnt downstream from the turbine and the working air is heated after compression, solely by the matrix of the regenerator (except so far as unavoidable carry-over gas in the matrix may contribute heat). It follows that, effectively, the combustion products and any solids or harmful contents thereof, do not pass through the turbine.

Preferably the regenerator is provided with a flow of scavenging air which if at appropriately selected pressure, may also afford sealing action in the regions where the drum has to pass in as nearly flow-tight as possible relation to the casing and to the internal wall. To this end an interstage tapping 15 is led from the turbine to the seal part 16 of the regenerator casing wall which subtends not much less than two segments (10A, 10B) of the matrix. Thus air, at appropriate pressure, may be blown through the matrix inwards on the heater side to remove ash, etc. and to charge the matrix with pure air before the passage through it of compressed air. The invention further includes the provision of air by-pass direct from the compressed air chest 5 to the turbine inlet. Such flow may be controllably throttled as by a valve 17, this additional control being intended to afford quicker response than can be achieved only by fuel control, since fuel control alone is subject to a necessary timelag if the running speed of the regenerator drum be fixed or of a slow order.

The by-passing of air is preferably controlled by governor means 25 driven by the turbine 11 and the supply of fuel to the burners 13, by slow-acting thermostatic means 25 responsive to the temperature of the matrix of the regenerator. The running speed of the regenerator may also be controlled manually or automatically as by thermostatic means 26 if required. Injection of a proportion of water along with the compressed air, may also be resorted to both as a means of control and where it is found desirable to operate with high humidity or with a proportionate steam content in the working fluid.

For starting, provision may be made to burn liquid fuel on the upstream side of the turbine by burners as at 18 Fig. 1 and/or even upstream of the regenerator on the heater side by burners as at 19, in which case the regenerator matrix may be initially heated up earlier and more gently than might be the case if starting were effected solely by the main (downstream) combustion.

I claim:

1. A system for producing power comprising a casing having an air inlet and an exhaust outlet and containing therein an air compressor arranged adjacent said inlet and receiving air therefrom and compressing it, a compressed air turbine for driving said compressor and for providing useful shaft power, a compressed air passageway arranged between said compressor and said turbine for directing the compressed air output of said compressor to said turbine, a combustion chamber arranged between said turbine and said exhaust outlet for receiving expanded air from said turbine, a fuel supply system for supplying fuel to said casing, fuel burning means in said combustion chamber for burning fuel in said expanded air to provide hot combustion products, and a regenerative heat exchanger consisting of a gas permeable heat-storage and heat-emitting mass, a frame for holding said mass rotatably supported in said casing and arranged with a part in said combustion chamber and a part in said compressor passage, a sealing partition in association with said frame sealing said combustion chamber from said passageway, and a driving connection operatively connecting said turbine and said frame for rotating it to enable each part of said mass to be brought alternately into contact with said combustion products prior to said products passing to said exhaust outlet to heat said mass and cool said products and to heat said compressed air and cool said mass to provide hot compressed air for expansion in said turbine to drive it.

2. A system for producing power comprising a casing having an air inlet and an exhaust outlet and containing therein an air compressor arranged adjacent said inlet and receiving air therefrom and compressing it, a compressed air turbine for driving said compressor and for providing useful shaft power, a compressed air passageway arranged between said compressor and said turbine for directing the compressed air output of said compressor to said turbine, a combustion chamber arranged between said turbine and said exhaust outlet for receiving expanded air from said turbine, a fuel supply system for supplying fuel to said casing, fuel burning means in said combustion chamber for burning fuel in said expanded air to provide hot combustion products, and a regenerative heat exchanger consisting of a gas permeable heat-storage and heat-transmitting mass, a hollow cylindrical frame for holding said mass in annular formation therein rotatably supported in said casing and arranged with a part in said combustion chamber and a part in said compressor passageway, a sealing partition arranged within said frame separating said parts and sealing said combustion chamber from said compressor passageway, and a driving connection operatively connecting said turbine and said frame for rotating it to enable each part of said mass to be brought alternately into contact with said combustion products prior to said products passing to said exhaust outlet to heat said mass and cool said products and to heat said compressed air and cool said mass to provide hot compressed air for expansion in said turbine to drive it.

3. A system for producing power comprising a casing having an air inlet and an exhaust outlet and containing therein an air compressor arranged adjacent said inlet and receiving air therefrom and compressing it, a compressed air turbine for driving said compressor and for providing useful shaft power, a compressed air passageway arranged between said compressor and said turbine for directing the compressed air output of said compressor to said turbine, a combustion chamber arranged between said turbine and said exhaust outlet for receiving expanded air from said turbine, a fuel supply system for supplying fuel to said casing, fuel burning means in said combustion chamber for burning fuel in said expanded air to provide hot combustion products, and a regenerative heat exchanger consisting of a gas permeable heat storage and heat transmitting mass, a hollow cylindrical frame having segment divisions in annular arrangement therein for holding said mass rotatably supported in said casing and arranged with a part in said combustion chamber and a part in said compressor passageway, a chord-wise sealing partition axially extending within said frame separating said parts and sealing said combustion chamber from said compressor passageway, and a driving connection operatively connecting said turbine and said frame for rotating it to enable each part of said mass to be brought alternately into contact with said combustion products prior to said products passing to said exhaust outlet to heat said mass and cool said products and to heat said compressed air and cool said mass to provide hot compressed air for expansion in said turbine to drive it.

JOHN FORSTER ALCOCK.

References Cited in the file of this patent

UNITED STATES PATENTS

| Number | Name | Date |
| --- | --- | --- |
| 1,184,767 | Mills | May 30, 1916 |
| 1,516,108 | Ljungström et al. | Nov. 18, 1924 |
| 1,702,264 | Lorenzen | Feb. 19, 1929 |
| 1,970,127 | Colby et al. | Aug. 14, 1934 |
| 2,298,625 | Larrecq | Oct. 13, 1942 |
| 2,341,638 | Martinka | Feb. 15, 1944 |
| 2,380,989 | Nettel et al. | Aug. 7, 1945 |
| 2,421,387 | Lysholm | June 3, 1947 |
| 2,483,045 | Harby | Sept. 27, 1949 |
| 2,524,066 | Andersen | Oct. 3, 1950 |

FOREIGN PATENTS

| Number | Country | Date |
| --- | --- | --- |
| 648,878 | Germany | Aug. 11, 1937 |
| 694,521 | Germany | Aug. 2, 1940 |